(12) United States Patent
Mizuno

(10) Patent No.: US 7,924,671 B2
(45) Date of Patent: Apr. 12, 2011

(54) OPTICAL DISC DRIVE APPARATUS, CAMERA APPARATUS, AND METHOD FOR CONTROLLING TILT OF LIGHT BEAM IN ACCORDANCE WITH SKEW IN OPTICAL DISC

(75) Inventor: Yuki Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 12/208,602

(22) Filed: Sep. 11, 2008

(65) Prior Publication Data

US 2009/0086600 A1     Apr. 2, 2009

(30) Foreign Application Priority Data

Sep. 28, 2007    (JP) .................................. 2007-256511

(51) Int. Cl.
*G11B 11/00* (2006.01)
(52) U.S. Cl. ................ 369/53.19; 369/44.14; 369/44.32
(58) Field of Classification Search .................. None
See application file for complete search history.

(56) References Cited

U.S. PATENT DOCUMENTS

| 5,970,035 | A  | * | 10/1999 | Ohmori et al. | ............... | 369/53.2 |
| 7,493,631 | B2 | * | 2/2009  | Omori et al.  | ..................| 720/700 |
| 7,796,477 | B2 | * | 9/2010  | Sato          | ........................ | 369/44.32 |
| 2005/0055706 | A1 | * | 3/2005 | Omori et al. | ................. | 720/700 |
| 2007/0165500 | A1 | * | 7/2007 | Sato         | ......................... | 369/44.32 |
| 2008/0025163 | A1 | * | 1/2008 | Suzuki       | ....................... | 369/44.14 |

\* cited by examiner

*Primary Examiner* — Daniell L Negrón
*Assistant Examiner* — Huy D Nguyen
(74) *Attorney, Agent, or Firm* — Oblon, Spivak, McClelland, Maier & Neustadt, L.L.P.

(57) ABSTRACT

An optical disc drive apparatus includes a rotatably supporting drive unit supporting an optical disc, an optical pickup, an angular velocity sensor detecting the magnitude and direction of an angular velocity, a skew estimating section estimating disc skew from the result of detection by the angular velocity sensor, such that one estimated skew value in a case where the angular velocity is applied in a direction in which the optical disc moves away from the optical pickup differs from another estimated skew value in a case where the angular velocity of the same magnitude but in the opposite direction, in which the optical disc approaches the optical pickup, is applied, and a tilt drive section changing the tilt of the light beam in accordance with the estimated skew value and correcting a shift, occurring because of the angular velocity, in a light beam applying position on the optical disc.

8 Claims, 7 Drawing Sheets

FIG. 6A

| r | k |
|---|---|
| 24 | 2.1 |
| 24.1 | 2 |
| 24.2 | 1.9 |
| ⋮ | ⋮ |
| 58 | 0.6 |

FIG. 6B

| r | k |
|---|---|
| 24 | 7.9 |
| 24.1 | 7.7 |
| 24.2 | 7.5 |
| ⋮ | ⋮ |
| 58 | 1.9 |

OPTICAL DISC DRIVE APPARATUS, CAMERA APPARATUS, AND METHOD FOR CONTROLLING TILT OF LIGHT BEAM IN ACCORDANCE WITH SKEW IN OPTICAL DISC

CROSS REFERENCES TO RELATED APPLICATIONS

The present invention contains subject matter related to Japanese Patent Application JP 2007-256511 filed in the Japanese Patent Office on Sep. 28, 2007, the entire contents of which are incorporated herein by reference.

BACKGROUND OF THE INVENTION

1. Field of the Invention

The present invention relates to optical disc drive apparatuses and camera apparatuses in which the tilt of a light beam can be controlled in accordance with skew occurring in an optical disc by using an angular velocity sensor configured to detect the angular velocity applied to the optical disc that is rotating. The present invention also relates to methods for controlling the tilt of a light beam in accordance with skew occurring in an optical disc by using an angular velocity sensor.

2. Description of the Related Art

Optical disc drive apparatuses perform recording and reproduction of information, in which a light beam (LB) emitted from an optical pickup is applied to an optical disc while the optical disc is rotating rapidly. In this operation, focus control and tracking control of the optical pickup are accurately performed so that the light beam (LB) emitted from the optical pickup is accurately applied to tracks provided on a signal recording surface of the optical disc. However, when an external force is applied for some reason, skew may occur in the optical disc. If the amount of skew exceeds a predetermined tolerance, it becomes difficult to realize accurate application of the light beam, leading to interruption of recording and reproduction. Therefore, it is desired to provide a preventive measure.

To prevent the occurrence of skew, an operation for correcting a relative angular shift of the optical pickup (or an objective lens thereof) with respect to the optical disc, namely tilt control, is desired to be performed. There are two kinds of tilt control: a method in which the objective lens is tilted, and a method in which the entirety of the optical pickup is tilted.

To perform tilt control, it is desired to detect the amount of tilt (skew) in the optical disc. There are various exemplary methods for such detection.

For example, Japanese Unexamined Patent Application Publication No. 2001-43605 discloses an optical disc drive apparatus in which a measuring beam is applied to an optical disc from an optical component called a tilt sensor, which is provided separately from an optical pickup, and the tilt of the optical disc is detected from a shift in the reflected beam position, whereby a skew value is obtained.

Japanese Unexamined Patent Application Publication No. 11-339371 discloses another exemplary optical disc drive apparatus in which detection of the skew value is performed by using a monoaxial angular velocity sensor. This optical disc drive apparatus employs a control method in which the monoaxial angular velocity sensor calculates the skew (radial skew) in the optical-disc radial direction in which an optical pickup is movably disposed, and, if skew exceeding a skew margin occurs, recording is stopped.

SUMMARY OF THE INVENTION

In the control method employed in Japanese Unexamined Patent Application Publication No. 11-339371, correction of the tilt of the optical pickup (tilt correction) in accordance with the calculated skew value is not performed. Accordingly, the recording margin is smaller than in a case where the aforementioned correction is performed.

Therefore, if angular velocity is continually applied during shooting in a case where the optical disc drive apparatus is included in a video camera apparatus, for example, a problem may arise that recording is interrupted frequently.

On the other hand, there is an existing patent application, Japanese Patent Application No. 2006-207035 made by the present applicant, that discloses an optical disc drive apparatus in which disc skew is estimated referring to an output from a biaxial angular velocity sensor and a tilt drive section (tilt actuator) is controlled so as to correct the estimated skew.

However, in the method proposed in Japanese Patent Application No. 2006-207035, it is not considered that the amount of radial skew occurring when an optical disc that is rotating is tilted varies between a case where the optical disc approaches the optical pickup and a case where the optical disc moves away from the optical pickup. Specifically, depending on a rotatably supporting mechanism included in the optical disc drive apparatus, different repulsions against the tilt of the optical disc are produced on the front and back surfaces of the optical disc. Such a difference in repulsion makes actual skew values under the same force different from each other. Therefore, in the optical disc drive apparatus proposed in Japanese Patent Application No. 2006-207035, the tilt actuator may be controlled while disc skew occurring because of a gyro effect is underestimated or overestimated. In such a case, accuracy in tilt correction may be insufficient, leaving room for improvement.

The above-described problem is not considered to arise if skew is obtained by directly detecting with a tilt sensor as in Japanese Unexamined Patent Application Publication No. 2001-43605, not by estimating with an angular velocity sensor.

However, tilt sensors have some disadvantages such as low availability, necessity of adjusting the installation angle, and limitation of installation position because of being an optical sensor.

In particular, the tilt sensor in Japanese Unexamined Patent Application Publication No. 2001-43605, which is only used as a trigger to stop recording and is not desired to have high accuracy, is desired to measure the tilt angle if tilt correction is performed. The tilt angle is desired to be measured along the radius of the optical disc (at positions to which the beam is applied) corresponding to a line along which the optical pickup is movably disposed. However, the optical pickup is provided with a moving mechanism that can move the optical pickup back and forth from end to end of the line corresponding to the radius of the optical disc. Under such circumstances, the tilt sensor is undesirably disposed at a position deviating from the line corresponding to the radius of the optical disc along which the beam is applied, so as not to interrupt the movement of the optical pickup. Thus, in the case where tilt correction is performed by using a tilt sensor, such difficulty in disposing the tilt sensor at a proper position may lead to correction errors.

The present invention relates to improvement of the correction accuracy realized in an existing application, made by the present applicant, that proposes an optical disc drive apparatus capable of performing tilt control in accordance with the result of estimation of optical disc skew using an angular velocity sensor.

According to an embodiment of the present invention, an optical disc drive apparatus includes a rotatably supporting drive unit configured to apply a rotatably driving force to an optical disc rotatably supported thereby, an optical pickup configured to apply a light beam to the optical disc that is rotating, an angular velocity sensor, a skew estimating section, and a tilt drive section.

The angular velocity sensor is configured to detect the magnitude and direction of an angular velocity acting about an axis lying in a radial direction of the optical disc in which the optical pickup is movably disposed, the angular velocity occurring because of an external force and being applied to the optical disc that is rotating.

The skew estimating section is configured to estimate skew in the optical disc in accordance with a result of detection by the angular velocity sensor, such that one estimated skew value in a case where the angular velocity is applied in one direction in which the optical disc moves away from the optical pickup is made to differ from another estimated skew value in a case where the angular velocity is applied in the same magnitude as that of the one estimated skew value but in another direction, opposite to the one direction, in which the optical disc approaches the optical pickup.

The tilt drive section is configured to change the tilt of the light beam in accordance with the estimated skew value and to correct a shift in a position on the optical disc where the light beam is applied, the shift occurring because of the angular velocity.

In this embodiment, it is preferable that the skew estimating section receive positional information in the radial direction corresponding to the position on the optical disc where the light beam is applied, and generate an estimated skew value corresponding to the amount of warpage in the optical disc in accordance with the positional information that is received.

In this embodiment, it is also preferable that the skew estimating section generate an estimated skew value corresponding to the amount of warpage in the optical disc in accordance with a linear velocity at the position on the optical disc where the light beam is applied.

According to another embodiment of the present invention, a camera apparatus includes a shooting section, a rotatably supporting drive unit configured to apply a rotatably driving force to an optical disc rotatably supported thereby, an optical head, an angular velocity sensor configured to detect the angular velocity in the same manner as in the optical disc drive apparatus described above, and a skew estimating section configured to estimate skew in the same manner as in the optical disc drive apparatus described above. The tilt drive section corrects, in accordance with the estimated skew value, a shift in a position on the optical disc where the light beam is applied, the shift occurring because of the angular velocity.

According to another embodiment of the present invention, a method for controlling the tilt of a light beam in accordance with skew in an optical disc is provided. The method includes the following steps: applying a rotatably driving force to the optical disc that is supported in a rotatable state while applying the light beam from an optical pickup to the optical disc that is rotating; detecting the magnitude and direction of an angular velocity acting about an axis lying in a radial direction of the optical disc in which the optical pickup is movably disposed, the angular velocity occurring because of an external force and being applied to the optical disc that is rotating; estimating a skew value in the optical disc in accordance with a result of detecting the angular velocity; and changing the tilt of the light beam in accordance with the skew value that is estimated and correcting a shift in a position on the optical disc where the light beam is applied, the shift occurring because of the angular velocity. The skew value is estimated such that one skew value in a case where the angular velocity is applied in one direction in which the optical disc moves away from the optical pickup is made to differ from another skew value in a case where the angular velocity is applied in the same magnitude as that of the one skew value but in another direction, opposite to the one direction, in which the optical disc approaches the optical pickup.

In the above-described embodiments, when a rotatably driving force is applied to the optical disc that is rotatably supported, the optical disc rotates. During this rotation, the optical disc is subjected to an external force. If the external force includes a torque component acting about an axis lying in a radial direction of the optical disc in which the optical pickup is movably disposed, a force corresponding to the angular velocity produced by the torque is applied to the optical disc, as a force acting about an axis orthogonal to the foregoing axis in the surface of the optical disc. Therefore, the optical disc is deflected such that the recording surface thereof moves away from or approaches the optical pickup. Whether the recording surface of the optical disc moves away from or approaches the optical pickup depends on the direction of the angular velocity to be applied about the aforementioned axis.

The optical disc rotates while, for example, being supported at a portion around a spindle hole on one of a recording surface (the surface near to the optical pickup) and a non-recording surface (the surface far from the optical pickup) thereof. Further, a portion around the spindle hole on the other surface of the optical disc is pressed by a member. When the optical disc in such a state is warped by a force applied thereto, the magnitude of the repulsion applied by the supporting member to the optical disc with respect to the warpage varies depending on whether the recording surface of the optical disc moves away from or approaches the optical pickup. Therefore, even if forces of the same magnitude are applied to the optical disc, the amount of skew occurring in the optical disc varies in accordance with the direction of angular velocity.

In the embodiments of the present invention, skew is estimated from the magnitude and direction of angular velocity that is detected, such that different values of estimated skew are provided for different directions of angular velocities even if such angular velocities have the same magnitude.

According to the embodiments of the present invention, skew values can be estimated with high accuracy in accordance with the direction of detected angular velocity. Since the tilt of the light beam is changed referring to skew values estimated in such a manner, tilt correction can be advantageously performed with high accuracy.

BRIEF DESCRIPTION OF THE DRAWINGS

FIGS. 6A and 6B relates to the embodiment of the present invention and show the relationships between disc radial positions (r) and radial skew coefficients (k) in a single-speed mode and a double-speed mode, respectively;

DESCRIPTION OF THE PREFERRED EMBODIMENTS

The present invention can be applied to apparatuses such as stationary optical disc reproduction apparatuses and optical disc recording/reproduction apparatuses. In particular, the present invention is suitable for portable apparatuses that are frequently subjected to external forces generated by rotations during shooting (or reproduction), such as video camera apparatuses that include optical disc drive apparatuses.

Embodiments of the present invention will now be described with reference to the drawings, taking a portable video camera apparatus as an example.
Overall Configuration FIG. 1 is a schematic block diagram of a video camera apparatus according to an embodiment of the present invention.

Figure 1:
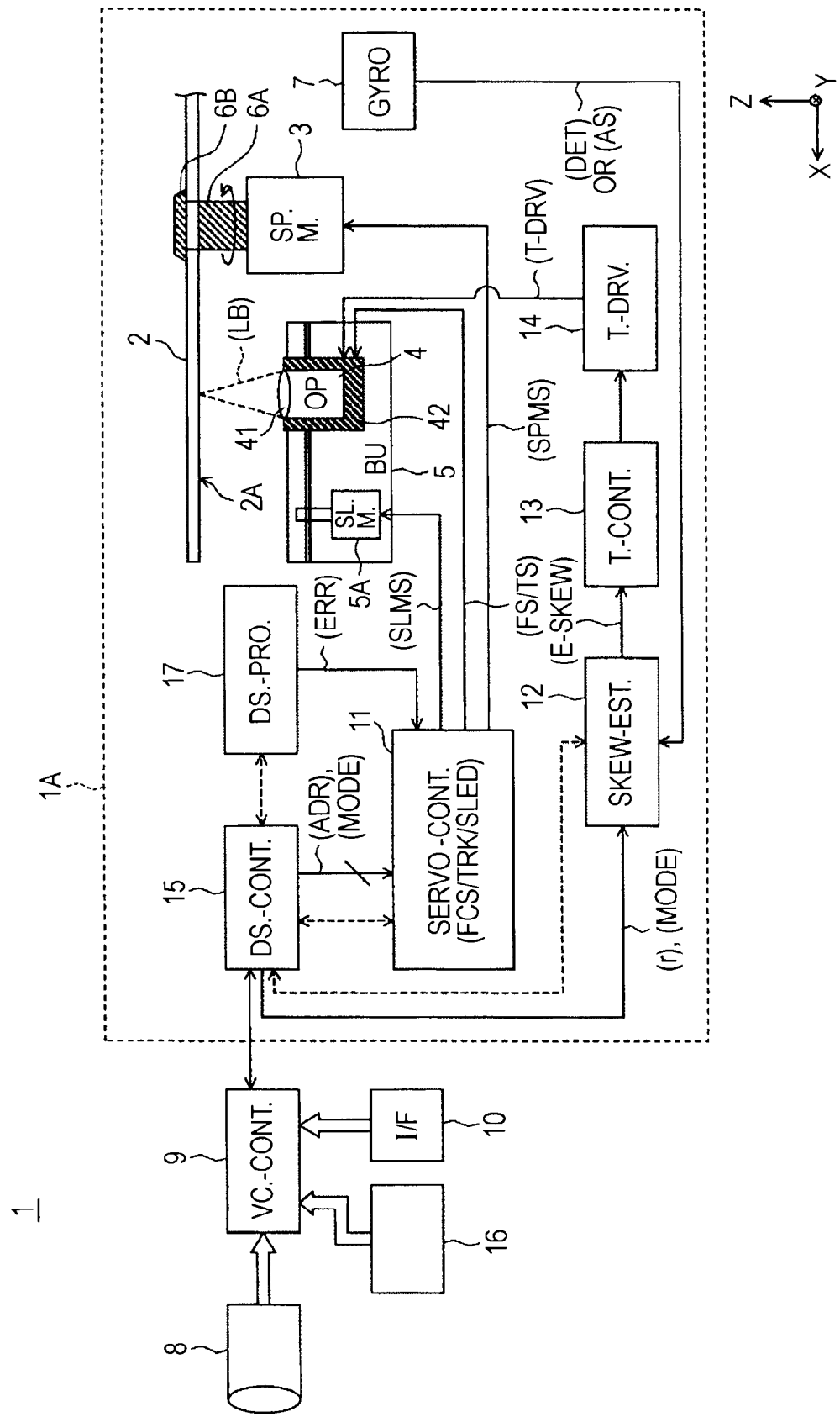
FIG. 1 is a block diagram schematically showing a video camera apparatus according to an embodiment of the present invention.

A video camera apparatus 1 shown in FIG. 1 removably houses an optical disc 2 serving as a data recording medium. The optical disc 2, such as a digital versatile disc-recordable or -rewritable (DVD-R/RW), a Blu-ray Disc (a registered trademark), or the like, has a disc-like shape with a diameter of about 12 cm. The optical disc 2 has a recording layer on at least one of the surfaces thereof with a protective layer interposed therebetween, thereby forming a recording surface 2A.

The video camera apparatus 1 also houses, around the optical disc 2, a spindle motor (SP.M.) 3 that drives the optical disc 2 to rotate, an optical pickup (OP) 4 that controls application of a light beam (LB) to the recording surface 2A of the optical disc 2, a moving mechanism that moves the optical pickup 4 in the radial direction of the optical disc 2, and a drive base unit (BU) 5 that includes a drive source. The drive base unit 5 includes a sled motor (SL.M.) 5A that moves the optical pickup 4 in the radial direction of the optical disc 2.

A motor shaft (not shown) of the spindle motor 3 is provided with a rotatably supporting member called a tapered cone 6A. The tapered cone 6A is connected to the spindle motor 3, thereby rotating on its own axis. In this state, the optical disc 2 is supported at a portion on one surface thereof around a spindle hole in its center by the tapered cone 6A. Accordingly, the optical disc 2 rotates (on its own axis) rapidly with the aid of a driving force transmitted from the spindle motor 3. Further, a magnet member (chucking plate 6B) presses a portion on the other surface of the optical disc 2 around the spindle hole with an appropriate pressure.

The tapered cone 6A, the chucking plate 6B, and the spindle motor 3 are exemplary components of a "rotatably supporting drive unit".

When an external force is applied to the optical disc 2, skew occurs. To detect the external force as an angular velocity about an axis (a single axis or two axes), an angular velocity sensor (GYRO) 7 is provided in the video camera apparatus 1.

The angular velocity sensor 7 is also called a gyro sensor. There are several types of gyro sensors, such as a rotating wheel type, a vibrating type using a tuning-fork piezoelectric element, and the like. In an angular velocity sensor, the detecting direction is determined monoaxially or biaxially. In this embodiment, although monoaxial detection may be employed, biaxial detection is desirable. Hereinafter, the embodiment will be described with the proviso that the angular velocity sensor 7 is of a biaxial-detection type.

The angular velocity sensor 7 of the biaxial-detection type is disposed such that a first detection axis thereof becomes, at a position where the optical pickup 4 is disposed, parallel to the radial direction of the optical disc 2 in which the spot of the light beam (LB) is scanningly moved back and forth, and that a second detection axis thereof coincides with the tangential direction of the optical disc 2 orthogonal to the radial direction in a plane parallel to the surface of the optical disc 2.

The angular velocity sensor 7, in which directions of the detection axes can be determined as described above, can be disposed at any position inside the video camera apparatus 1 and relatively near the optical disc 2. For example, when the angular velocity sensor 7 is disposed in the drive base unit 5 and in a plane highly parallel to the optical disc 2 that is rotating rapidly, directions of the detection axes can be determined easily. Therefore, such a configuration is preferred.

When a biaxial angular velocity sensor (gyro sensor) is included in the video camera apparatus 1 as a vibration detecting sensor for prevention of motion blurring, a portion of an output (detection signal: DET) from the angular velocity sensor 7 may be output to a motion blur correcting block (not shown). In this manner, the angular velocity sensor 7 may be used for both detection of skew and detection of motion blur.

The video camera apparatus 1 includes a shooting section 8 that shoots an image of an object, processes the shot image into a corresponding shooting signal, and outputs the shooting signal.

The shooting section 8 includes optical components such as an optical lens and a filter, mechanical components such as a shutter, and so forth.

The video camera apparatus 1 includes a video camera control section (VC.-CONT.) 9 and an optical disc drive apparatus 1A. The video camera control section 9 is connected to an interface (I/F) 10, which is capable of inputting a signal (video signal) from an external terminal (not shown) and outputting a signal to the external terminal, and an operating section 16.

The optical disc drive apparatus 1A includes a servo control section (SERVO-CONT.) 11, a drive system control section (DS.-CONT.) 15, and a drive signal processing section (DS.-PRO.) 17. The above-mentioned "rotatably supporting drive unit" including the spindle motor 3, the drive base unit 5 including the optical pickup 4, and the angular velocity sensor 7 are all provided in the optical disc drive apparatus 1A. The drive system control section 15 receives a command from the video camera control section 9 and controls recording and reproduction operations. Details will be described separately below.

The optical pickup 4 is an integrated unit that includes various optical components such as a laser diode (LD) and an objective lens 41, and other circuits (some of these components are not shown). The optical pickup 4 also includes a signal photodetector that generates a reproduction signal by photoelectric conversion, and a photodetector for monitoring the amount of LD light.

The signal photodetector (not shown) is a device that generates a reproduction signal from the light reflected during reproduction and is capable of detecting a focus error signal and a tracking error signal.

The photodetector (not shown) for monitoring the amount of LD light is used for feedback control in which the amount of LD light is maintained at constant levels suitable for recording and reproduction.

The optical pickup 4 can move the objective lens 41 in directions of the radius and normal of the optical disc 2. The optical pickup 4 includes a triaxial actuator 42 capable of tilting the objective lens 41 in a direction in which radial skew (or tangential skew) is corrected.

The optical disc drive apparatus 1A includes the servo control section 11 that controls focusing servo and tracking servo for the optical pickup 4 and the number of revolutions for the spindle motor 3.

The servo control section 11 can receive an error signal (ERR) from the drive signal processing section 17. The servo control section 11 performs control operations described above in accordance with the error signal (ERR) that is input thereto. In such operations, the servo control section 11 generates and outputs a focusing servo signal (FS) and a tracking servo signal (TS) to the triaxial actuator 42, generates and outputs a spindle motor servo signal (SPMS) to the spindle motor 3, and generates and outputs a sled motor servo signal (SLMS) to the sled motor 5A.

A major feature of this embodiment is that the optical disc drive apparatus 1A includes a skew estimating section (SKEW-EST.) 12, a tilt control section (T.-CONT.) 13, and a tilt drive section (T.-DRV.) 14 that drives and controls the triaxial actuator 42.

The skew estimating section 12 can receive a detection signal (DET) from the angular velocity sensor 7. The skew estimating section 12, which will be described in detail separately below, basically estimates the amount of skew occurring in the optical disc 2, with reference to the detection signal (DET) that is received. Thus, the skew estimating section 12 outputs an estimated skew value (E-SKEW) to the tilt control section 13.

In skew estimation performed by the skew estimating section 12 in this embodiment, an estimated skew value in a case where an angular velocity is applied in a direction in which the optical disc 2 moves away from the optical pickup 4 is made to differ from an estimated skew value in a case where an angular velocity of the same magnitude but in the opposite direction (having the opposite polarity) in which the optical disc 2 approaches the optical pickup 4 is applied, in accordance with the direction (polarity) of the angular velocity contained as a piece of information in the detection signal (DET). A method for controlling the estimated skew value (E-SKEW) in accordance with the direction of the angular velocity and a configuration for realizing the same will be described separately below.

The tilt control section 13 converts the estimated skew value (E-SKEW) provided by the skew estimating section 12 into a controlled variable used for controlling the tilt of the light beam emitted from the optical pickup 4, and outputs the controlled variable to the tilt drive section 14.

The tilt drive section 14 generates a tilt drive signal (T-DRV) in accordance with the controlled variable that is input thereto from the tilt control section 13, and outputs the tilt drive signal (T-DRV) to the triaxial actuator 42 provided in the drive base unit 5.

The video camera control section 9A functions as a circuit that controls the entirety of the video camera apparatus 1 described above and shown in FIG. 1.

The drive system control section 15 generates an address signal (ADR) indicating the address on the optical disc 2, a radial position (r) on the optical disc 2 (hereinafter referred to as a disc radial position (r)), and a mode signal (MODE) indicating the speed mode such as a single-speed mode or a double-speed mode. The drive system control section 15 outputs the address signal (ADR) to the servo control section 11, the disc radial position (r) to the skew estimating section 12, and the mode signal (MODE) to the servo control section 11 and the skew estimating section 12.

In addition, the drive system control section 15 is connected to the servo control section 11, the skew estimating section 12, the drive signal processing section 17, and so forth with control lines shown in broken lines in FIG. 1.

Disc Addresses and Speed Modes

Next, disc addresses and speed modes will be described.

The recording surface 2A of the optical disc 2 has tracks that are spirally provided thereon. Information divided into blocks of desired sizes is recorded on the tracks. The blocks of information are given sequential addresses starting from the one recorded on the innermost position of the optical disc 2.

Therefore, in reading a desired information, the servo control section 11 moves the optical pickup 4, with reference to the corresponding address, to an appropriate radial position where the light beam can be applied to the track having the desired information (hereinafter referred to as the desired track).

The video camera apparatus 1 employs a constant linear velocity (CLV) method, in which the rotating speed of the optical disc 2 is controlled as desired, whereby the linear velocity at which the light beam (LB) follows the tracks provided on the recording surface 2A is maintained at a constant level.

The video camera apparatus 1 records and reproduces data in two modes: a single-speed mode in which a linear velocity at a normal speed specified by a standard or the like is realized, and a double-speed mode in which a linear velocity at a speed about twice the normal speed is realized by rotating the optical disc 2 at a speed higher than the normal speed.

These two modes can be switched therebetween by user operation. The operation of mode switching proceeds as follows. A mode instruction is input from the operating section 16 and is detected via the video camera control section 9 by the drive system control section 15. In response to this, the drive system control section 15 generates and outputs a mode signal (MODE) to the servo control section 11. Subsequently, the servo control section 11 performs feedback control of the number of revolutions of the spindle motor 3, referring to the address signal (ADR), so that a linear velocity in the desired mode indicated by the mode signal (MODE) that has been input thereto can be obtained at the corresponding track position on the optical disc 2.

Recording and Reproduction Operations

Next, the outline of operations performed by the video camera apparatus 1 having the above-described configuration will be described.

When a shooting start button on the operating section 16 is pressed, recording is started by the video camera control section 9 and a video signal is converted into a recording signal. The recording signal is recorded on the optical disc 2 via the drive system control section 15.

During data recording, reflected light is monitored by the signal photodetector and the photodetector for monitoring the amount of LD light, both photodetectors being provided in the optical pickup 4. Monitoring signals are constantly input to the drive signal processing section 17. Under the control of the drive system control section 15, the drive signal processing section 17 generates a focus error signal indicating the length of deviation of the focal position of the light beam (LB) from the recording surface 2A of the optical disc 2, and also generates a tracking error signal indicating the length of deviation of the light beam (LB) applying position from the desired track. These signals are sent as error signals (ERRs) to the servo control section 11.

The servo control section 11 controls the triaxial actuator 42 and so forth in accordance with the error signals (ERRs) that are input thereto, and biaxially moves the objective lens 41 along the X axis (an axis in the radial direction) and the Z axis (an axis in a direction of the normal).

More specifically, the objective lens 41 is moved in a direction toward or away from the optical disc 2 (in the Z-axis direction) such that the level of the focus error signal is reduced, whereby feedback control for focusing the light beam (LB) on the recording surface 2A of the optical disc 2, i.e., focus control, is realized.

At the same time, the objective lens 41 is moved in a direction toward the inner or outer side of the optical disc 2 (in the X-axis direction) such that the level of the tracking error signal is reduced, whereby feedback control for causing the focus of the light beam (LB) to follow the desired track, i.e., tracking control, is realized.

If the focus of the light beam (LB) is not on the desired track during tracking control performed at an early stage of a series of control operations, for example, tracking control becomes difficult. In such a case, the servo control section 11 causes the sled motor 5A to roughly move the optical pickup 4 in the X-axis direction and then causes the triaxial actuator 42 to perform more precise tracking control. Subsequently, focus control and tracking control are performed simultaneously. Thus, the focus of the light beam (LB) can be made to follow the desired track.

In data reproduction, a reproduction instruction is output to the drive system control section 15 via the video camera control section 9 in accordance with an operation performed with the operating section 16. In response to this, the spindle motor 3 is activated by the servo control section 11. At the same time, under the control of the servo control section 11, the optical pickup 4 is moved by the sled motor 5A provided in the drive base unit 5 in such a manner as to seek the track position on the optical disc 2 where desired data to be reproduced is recorded. Then, reproduction is started.

In a case where a light beam (LB) continuously emitted from the optical pickup 4 is applied to the recording surface 2A of the optical disc 2 during data reproduction, the light is reflected while being modulated in accordance with the recording signal because reflectance differs between a marked position and an unmarked position on the recording layer. The reflected light is incident on the signal photodetector and is subjected to photoelectric conversion. A reproduction signal obtained as a result of the photoelectric conversion is output from the signal photodetector to the drive signal processing section 17.

After being subjected to a predetermined processing performed by the drive signal processing section 17, the reproduction signal is output through, for example, a display unit and a speaker (not shown) as an image and a sound. Alternatively, the reproduction signal after being processed may be output to an external terminal (not shown) via the interface 10.

During the above-described recording or reproduction, the amount of light as the light beam (LB) is monitored by both the photodetector for monitoring the amount of LD light and an automatic gain control (AGC) circuit (not shown) connected to the photodetector.

Specifically, the following operations are performed. A portion (about several percent) of the light beam (LB) emitted during recording or reproduction is input to the photodetector for monitoring the amount of LD light. In accordance with the monitored amount of light, an LD gain control signal is generated. In accordance with the LD gain control signal, the entire level of a signal for driving the laser diode (LD) is finely adjusted. Thus, even if the amount of LD light changes over time or is disturbed, the average amount of light as the light beam (LB) used for recording or reproduction can be maintained at a constant level as desired.

Usually, the AGC circuit (not shown) that automatically controls the gain helps realization of quick response when disposed in the optical pickup 4 or in the drive base unit 5.

Skew

Next, the occurrence mechanism and definition of skew will be described.

In general, a disc-like object that is rotating rapidly, as well as another object connected thereto, is stabilized in a certain form (the gyro effect). If the object in such a state is deflected by an external force, an inertial force (a Coriolis force) of a magnitude proportional to the deflecting speed is produced in a direction perpendicular to the deflecting direction, in a rotating reference frame.

Therefore, in FIG. 1, if a torque as an external force acting about an axis (first axis) parallel to the surface of the optical disc 2 is applied to the optical disc 2 and other components (the tapered cone 6A and the chucking plate 6B) that are rotating with the optical disc 2, a Coriolis force as a torque acting about an axis (second axis) orthogonal to the first axis is produced in a plane parallel to the surface of the optical disc 2, because of the gyro effect. This Coriolis force acts on the optical disc 2. Hereinafter, a phenomenon in which an external force (torque) producing such a Coriolis force is applied about an axis will be expressed as "an angular velocity is applied about an axis", for example.

Since the optical disc 2 is not sufficiently rigid, the optical disc 2 itself deforms in accordance with an external force to be applied. Therefore, when an acceleration is applied about the X axis, along which the mounting position of the optical pickup 4 and the center of the optical disc 2 are aligned, the optical disc 2 is warped by a torque acting about the Y axis. Accordingly, the recording surface 2A is relatively deflected, with a point thereof where the laser beam is applied going toward or away from the optical pickup 4.

The light beam (LB) applied to the optical disc 2 is reflected by various optical components before being detected by the signal photodetector (not shown). From viewpoints of preventing occurrence of aberrations including coma and improving optical characteristics, it is desirable that the light beam (LB) be applied to the recording surface 2A of the optical disc 2 in a direction substantially perpendicular thereto (in the direction of the normal) so that the optical axes of the incident light and the reflected light substantially coincide with each other.

However, if the optical disc 2 is warped as described above, the recording surface 2A of the optical disc 2 is tilted with respect to the optical axis of the light beam (LB). If the angle of such tilt is large, the light beam (LB) may be reflected outside the range within which the signal photodetector can detect tracking errors. Consequently, recording and reproduction may not be performed.

Such tilt and warpage in the optical disc 2 that cause problems in recording and reproduction are generally called (disc) skew. The range of skew within which recording and reproduction can be performed is called a skew margin.

Now, the relationship between the angular velocity applied to the mechanism that drives the optical disc 2 and (disc) skew will be described.

Figure 2:
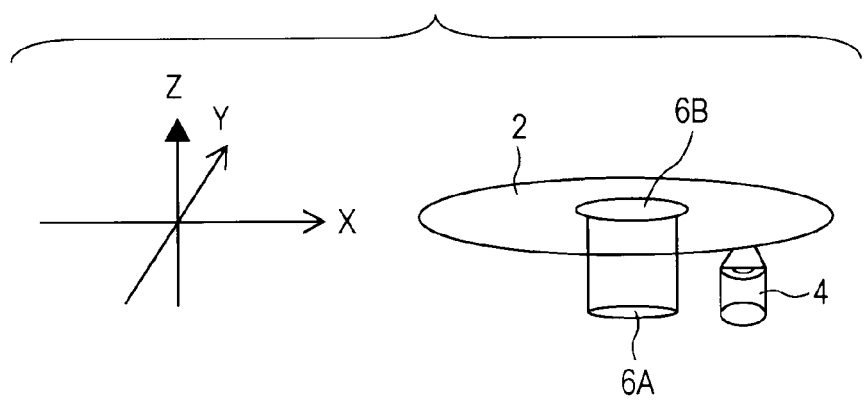
FIG. 2 shows definitions of the X, Y, and Z axes in the embodiment of the present invention.

FIG. 2 shows definitions of the X, Y, and Z axes.

According to these definitions also shown in FIG. 1, the X axis lies in the radial direction of the optical disc 2. The X axis takes positive values in the direction in which the optical pickup 4 is moved by the drive base unit 5 from the inner side toward the outer side of the optical disc 2.

In this state, the tangential direction orthogonal to the X axis in the surface of the optical disc 2 is defined as the Y axis. The positive side of the Y axis may be determined arbitrarily. In FIG. 2, the Y axis takes positive values in the direction from the front toward the rear.

The normal of a plane defined by the X and Y vectors is defined as the Z axis. With respect to the surface of the optical disc 2, the side having the chucking plate 6B is defined as the positive side of the Z axis, and the side having the tapered cone 6A is defined as the negative side of the Z axis.

Figure 3A:
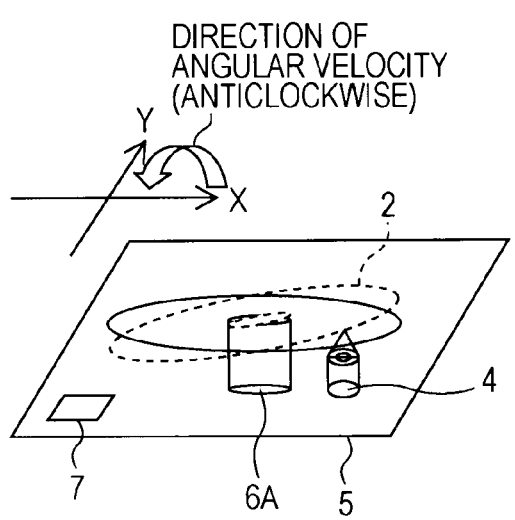
FIGS. 3A and 3B each show disc skew in a case where an angular velocity is applied about the X axis in the embodiment of the present invention.
Figure 3B:
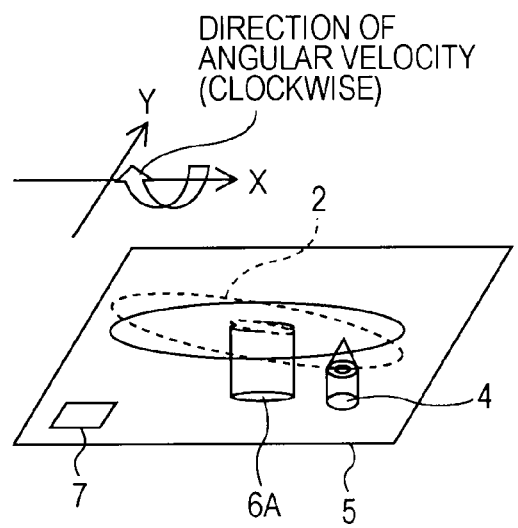

FIGS. 3A and 3B each show disc skew in a case where an angular velocity is applied about the X axis.

Referring to FIG. 3A or 3B, when an angular velocity is applied about the X axis to the optical disc 2 that is rotating, a torque (Coriolis force) acting about the Y axis is applied to the optical disc 2 because of the gyro effect, whereby skew occurs in the optical disc 2. Skew of this type is called "radial skew".

In the case shown in FIG. 3B where a clockwise angular velocity is applied, the optical disc 2 warps toward the optical pickup 4. In contrast, in the case shown in FIG. 3A where an anticlockwise angular velocity is applied, the optical disc 2 warps away from the optical pickup 4.

Figure 4A:
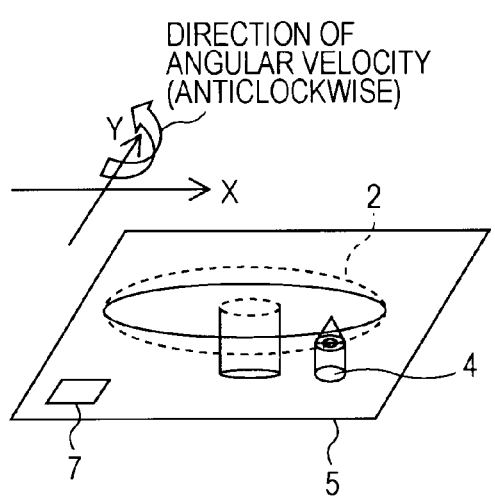
FIGS. 4A and 4B each show disc skew in a case where an angular velocity is applied about the Y axis in the embodiment of the present invention.
Figure 4B:
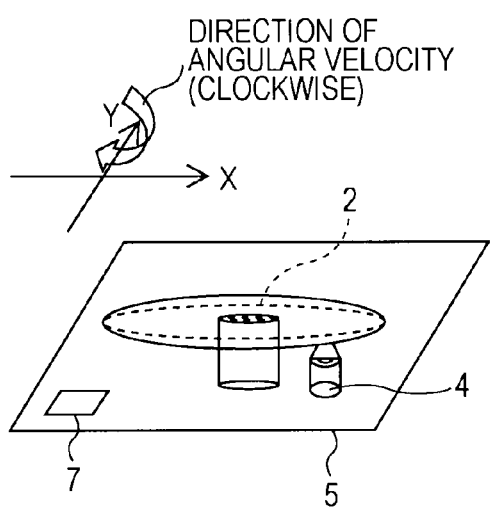

FIGS. 4A and 4B each show disc skew in a case where an angular velocity is applied about the Y axis.

Referring to FIG. 4A or 4B, when an angular velocity is applied about the Y axis to the optical disc 2 that is rotating, a torque (Coriolis force) acting about the X axis is applied to the optical disc 2 because of the gyro effect, whereby skew occurs in the optical disc 2. Skew of this type is called "tangential skew".

If the magnitudes of the external forces applied in the cases of the clockwise and anticlockwise angular velocities respectively shown in FIGS. 4B and 4A are the same, the intervals between the optical disc 2 and the optical pickup 4 in both cases are almost the same. However, the optical disc 2 is tilted, with the X axis as a fulcrum, in different directions on the positive side and the negative side of the Y axis. In FIG. 4B, the optical disc 2 is tilted downward on the positive side and upward on the negative side of the Y-axis direction. In FIG. 4A, the optical disc 2 is tilted upward on the positive side and downward on the negative side of the Y-axis direction.

Tilt Correction

Influences brought by skew occurring as described above can be reduced or eliminated in the following manner. The tilt drive signal (T-DRV) output from the tilt drive section 14 shown in FIG. 1 is input to the triaxial actuator 42, and the triaxial actuator 42 tilts the optical pickup 4 at an angle such that the light beam (LB) is applied to the optical disc 2 at an appropriate angle. Such a control operation will be referred to as "tilt control" or "tilt correction", and the angle at which the light beam (LB) is tilted will be referred to as a "tilt angle".

Figure 5:
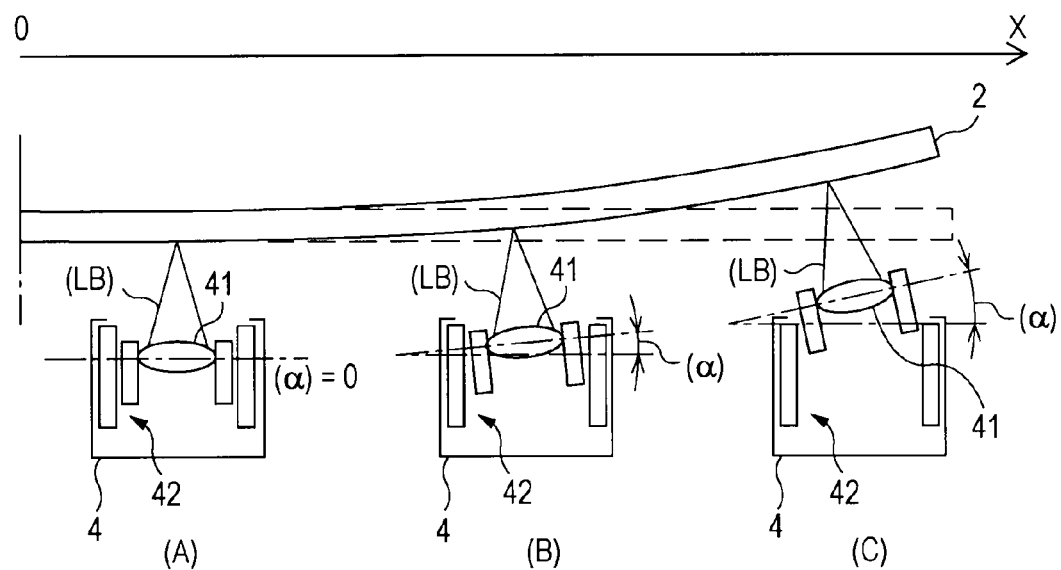
FIG. 5 relates to the embodiment of the present invention and shows the relationship between the amount of disc warpage and the tilt-controlled variable (tilt angle) when radial skew occurs in an optical disc 2.

FIG. 5 shows the relationship between the amount of disc warpage and the tilt-controlled variable (tilt angle) when radial skew occurs in the optical disc 2.

Referring to FIG. 5, when radial skew occurs, the central axis of the objective lens 41 is tilted at a certain tilt angle ($\alpha$) in accordance with the amount of radial skew occurring in the optical disc 2 by using a tilt actuator function of the triaxial actuator 42 provided in the optical pickup 4.

In FIG. 5, the amount of warpage in the optical disc 2 at positions (A), (B), and (C) increases in that order. The tilt angle ($\alpha$) is increased for warpage of larger amounts so that the optical axes of the incident light beam (LB) and the reflected light beam (LB) substantially coincide with each other.

The mechanism of tilt control for reducing or eliminating influences of radial skew can be understood from FIG. 5. Tilt control in a case where tangential skew occurs is almost the same as the case shown in FIG. 5, except that the central axis of the objective lens 41 is tilted in the Y-axis direction, not in the X-axis direction.

In this case, however, the triaxial actuator 42 needs to have a tilt actuator function that can realize biaxial tilt control performed in the X-axis direction and in the Y-axis direction independently.

Method for Estimating Skew

Next, a method for estimating disc skew will be described taking the case of radial skew as an example.

In tilt control, the objective lens 41 is adjusted at an optimum tilt angle ($\alpha$) in accordance with radial skew, as described above. Usually, a tilt actuator is operated under voltage control, in which the tilt angle ($\alpha$) is controlled in accordance with the input voltage. In such a case, the voltage of the tilt drive signal (T-DRV) to be applied to the triaxial actuator 42 is set to be proportional to the amount of radial skew occurring in the optical disc 2. To realize such an operation, it is desirable to estimate radial skew.

In FIG. 2, there is a positive correlation between the angular velocity about the X axis produced by an external force to be applied and the torque about the Y axis to be applied to the optical disc 2, according to the gyro effect, although directions of the two are different from each other. Moreover, under the same conditions, i.e., under the same number of revolutions, strength of the optical disc 2, and so forth, there is another positive correlation between the magnitude of the aforementioned torque and the amount of radial skew.

The positive correlation between angular velocity and skew substantially means that the amount of skew is the product of the magnitude of angular velocity and a positive variable coefficient.

Hence, skew can be estimated by calculating the variable coefficient. Further, in accordance with the estimated skew value, the voltage of the tilt drive signal (T-DRV) for eliminating influences of disc skew can be calculated.

This is the basic concept in designing the skew estimating section 12, the tilt control section 13, and the tilt drive section 14 shown in FIG. 1.

Factors Causing Variations in Skew

As described above, as the magnitude of angular velocity that is applied increases, the amount of skew increases. However, the two are not simply proportional to each other.

This is because the amount of skew actually changes because of three factors described below even if the same angular velocity is applied to the optical disc 2. In other words, the coefficient that determines the relationship between the magnitude of angular velocity and the amount of skew is not constant but variable mainly because of the following three factors.

A first factor is the radial position (address) on the optical disc 2.

In the video camera apparatus 1, referring to FIG. 1, a portion of the optical disc 2 around the spindle hole is chucked and rotatably held by relevant components. Usually, the optical disc 2 is made of resin or the like formed into a thin shape having a thickness of about 1.2 mm for a diameter of 120 mm, for example.

Therefore, when the optical disc 2 that is rotating is subjected to an external force, the optical disc 2, which is not sufficiently rigid, is warped as shown in FIG. 5. In such a case, the amount of disc skew is larger on the outer side than in the inner side.

Hence, even in cases where external forces of the same magnitude are applied, the optimum tilt angle ($\alpha$) of the objective lens 41 varies in accordance with the disc radial position (r) where data is picked up by the optical pickup 4.

To summarize, the coefficient (k) of radial skew (hereinafter referred to as the radial skew coefficient (k)) indicating the relationship between angular velocity (AS) detected by the angular velocity sensor 7 and radial (disc) skew occurring in the optical disc 2 varies in accordance with the disc radial position (r).

A second factor causing variations in skew is the difference in rotating speed of the optical disc 2.

The rotating speed of the optical disc 2 varies in accordance with the speed mode. The Coriolis force produced because of the gyro effect under external forces of the same magnitude also varies in accordance with the speed mode. Accordingly, the radial skew coefficient (k) that determines the relationship between the angular velocity (AS) about the X axis and the radial skew occurring in the optical disc 2 varies in accordance with the speed mode.

In general, as the number of revolutions of the optical disc 2 increases, the bending force produced by the gyro effect also increases. Therefore, even at the same angular velocity, as the number of revolutions of the optical disc 2 increases, the radial skew coefficient (k) also increases.

To verify the influences brought by the first and second factors, radial skew coefficients (k) were calculated.

FIGS. 6A and 6B are tables that summarize the results of calculations for obtaining radial skew coefficients (k) at various positions on the optical pickup 4 (disc radial positions (r)) in the single-speed mode and in the double-speed mode, respectively.

In the calculations summarized in FIGS. 6A and 6B, the disc radial position (r) was varied from 24 mm to 58 mm by a constant increment of 0.1 mm.

Figure 7:
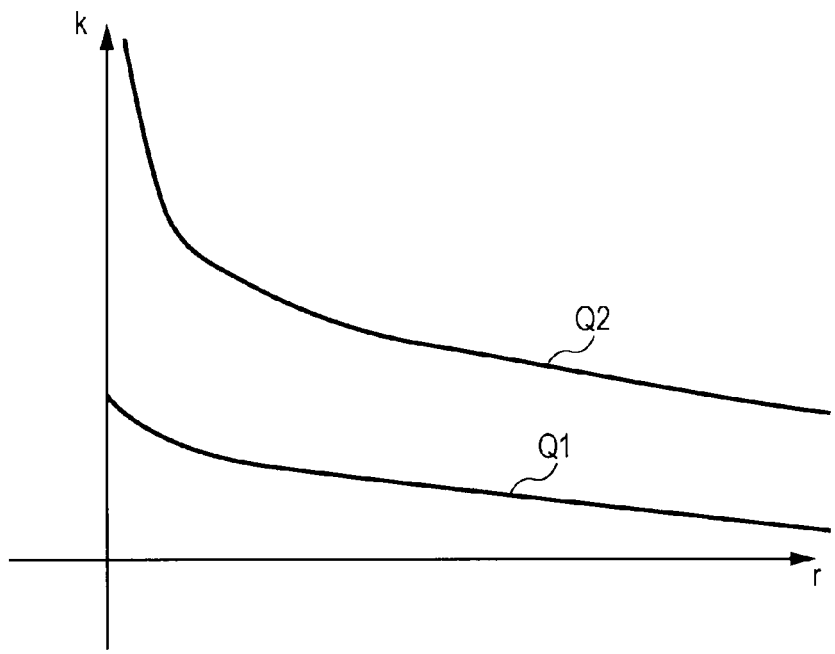
FIG. 7 relates to the embodiment of the present invention and shows the tables in FIGS. 6A and 6B in a form of a graph.

FIG. 7 shows the results of calculations summarized in FIGS. 6A and 6B in the form of a graph.

It is understood from FIG. 7 that the radial skew coefficient (k) with respect to the disc radial position (r) is larger in a characteristic curve Q2 (for the double-speed mode) than in a characteristic curve Q1 (for the single-speed mode). The difference between the two curves is very large on the inner side of the optical disc 2, where the disc radial position (r) is small, but is gradually reduced as the disc radial position (r) increases.

When recording or reproduction is performed by the CLV method, the number of revolutions of the optical disc 2 occasionally varies in accordance with the position where the optical pickup 4 picks up data (the disc radial position (r)). Further, the optical disc 2 is warped in accordance with the number of revolutions thereof. Under composite influences of the first, second, and other various factors, the radial skew coefficient (k) nonlinearly varies with the disc radial position (r). In particular, in the CLV method, since the rotating speed of the optical disc 2 is higher at more inner positions thereof, radial skew coefficients (k) at inner positions on the optical disc 2 in the double-speed mode are extremely larger than those in the single-speed mode.

Therefore, it is difficult to approximate the characteristic curves Q1 and Q2 in the form of simple functions or the like.

A third factor causing variations in skew is the direction of warpage in the optical disc 2.

Because of the chucking force, even at the same angular velocity, bendability of the optical disc 2 varies in accordance with the direction of radial skew with respect to the optical pickup 4, i.e., whether the recording surface 2A moves away from or approaches the optical pickup 4.

Let us consider the configuration shown in FIG. 1. The chucking plate 6B is a relatively thin member and is magnetically pressed against the optical disc 2. Therefore, when the optical disc 2 is tilted upward, the repulsion applied by the chucking plate 6B to the optical disc 2 is relatively small. In contrast, the tapered cone 6A supporting the optical disc 2 is a relatively thick member and is firmly secured to the motor shaft of the spindle motor 3. Therefore, when the optical disc 2 is tilted downward, the repulsion applied by the tapered cone 6A to the optical disc 2 is relatively large.

With such a difference in repulsion, even if angular velocities of the same magnitude are applied to the optical disc 2, the amount of radial skew (the radial skew coefficient (k)) varies depending on whether the optical disc 2 is tilted upward moving away from the optical pickup 4 or downward approaching the optical pickup 4.

In the above-described configuration, the radial skew coefficient (k) is larger when the optical disc 2 moves away from the optical pickup 4 than when the optical disc 2 approaches the optical pickup 4. This relationship may be reversed, however, depending on the configuration for rotatably supporting the optical disc 2.

Figure 8:
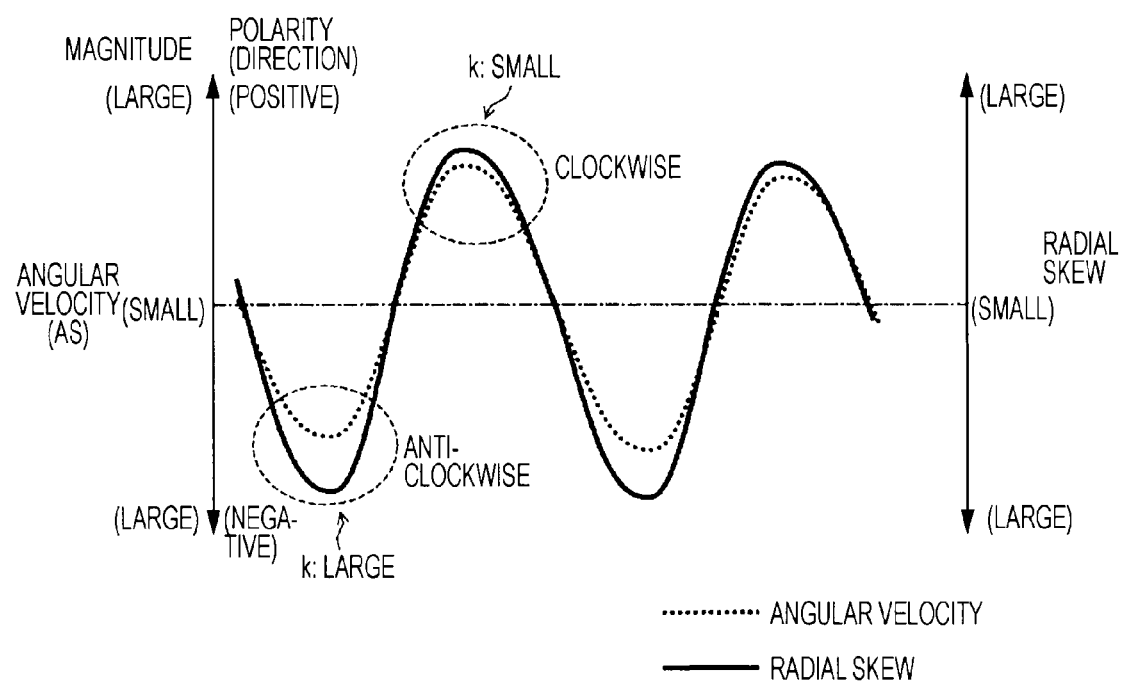
FIG. 8 relates to the embodiment of the present invention and schematically shows the relationship between angular velocity about the X axis and radial skew.

To verify the above-described phenomena, the relationship between the direction of the angular velocity about the X axis and radial skew was examined. FIG. 8 schematically shows the result of the examination.

It is understood from FIG. 8 that the actual radial skew is larger when an anticlockwise angular velocity is applied than when a clockwise angular velocity is applied, despite the fact that disc bending forces produced by the gyro effect are the same for the same direction of skew (the direction in which the optical disc 2 is tilted with respect to the optical pickup 4). More specifically, the difference between angular velocity and radial skew is larger in the case of an anticlockwise angular velocity about the X axis shown in FIG. 3A where the optical disc 2 moves away from the optical pickup 4 than in the case of a clockwise angular velocity about the X axis shown in FIG. 3B where the optical disc 2 approaches the optical pickup 4. FIG. 8 shows that the radial skew coefficient (k) in the case of an anticlockwise angular velocity is desired to be larger than the radial skew coefficient (k) in the case of a clockwise angular velocity.

These three factors, namely the three differences in the disc radial position (r), the number of revolutions of the optical disc 2, and the influence of the chucking force, apply not only to radial skew but also to tangential skew.

Therefore, coefficients used in tilt control for tangential skew are also desired to be set considering these three factors.

In general, radial skew is larger than tangential skew at the same angular velocity. Accordingly, tilt control with practically sufficient accuracy can be realized by performing tilt control for at least radial skew considering the three factors.

However, this concept does not exclude tilt control that accommodates both of radial skew and tangential skew. If tilt control with higher accuracy is desired, tilt control for both skews may be performed.

Specific Exemplary Configurations for Skew Estimation and Tilt Correction

Figure 9:
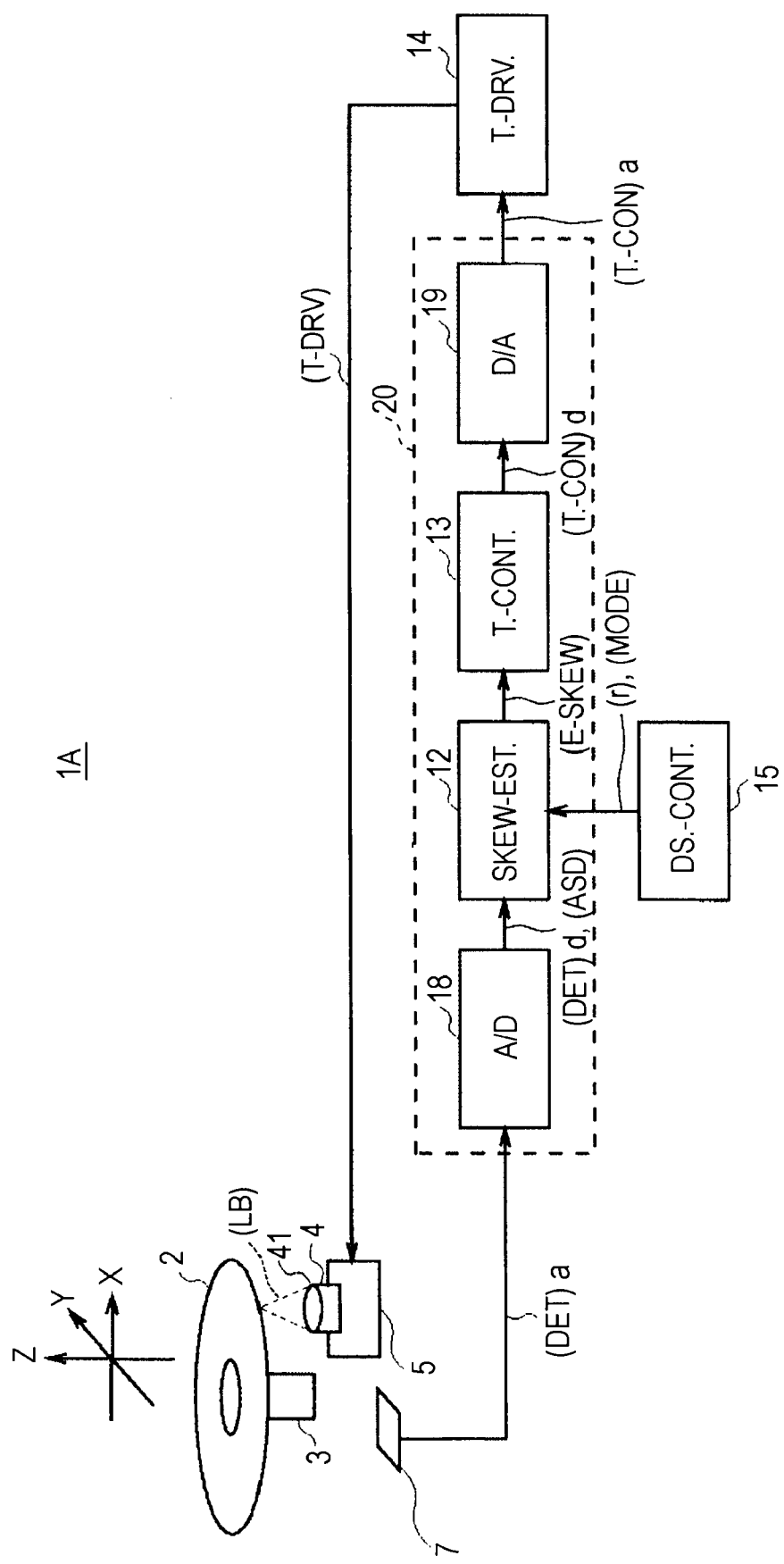
FIG. 9 relates to another embodiment of the present invention and is a block diagram showing details of relevant parts of the apparatus shown in FIG. 1.

FIG. 9 is a block diagram showing details of relevant parts of the apparatus shown in FIG. 1. The apparatus shown in FIG. 9 represents an embodiment of the optical disc drive apparatus according to the present invention.

The same as in FIG. 1, the optical disc drive apparatus 1A shown in FIG. 9 includes the spindle motor 3 that drives the optical disc 2 to rotate, the optical pickup 4 that includes the objective lens 41, the drive base unit 5 that includes the optical pickup 4, the angular velocity sensor 7, the tilt drive section 14, and the drive system control section 15. Detailed description of these components that have been given above will be omitted.

In this embodiment, the servo control section 11, the skew estimating section 12, and the tilt control section 13 shown in FIG. 1 are integrated as a servo digital signal processor (DSP) 20 serving as a single large-scale integration (LSI).

The servo DSP 20 further includes an analog-to-digital (A/D) converter 18 and a digital-to-analog (D/A) converter 19. The A/D converter 18 receives an analog detection signal (DET)a from the angular velocity sensor 7, converts the analog detection signal (DET)a into a digital detection signal (DET)d, and outputs the digital detection signal (DET)d to the skew estimating section 12. The D/A converter 19 converts a digital tilt control signal (T-CON)d that is output from the tilt control section 13 into an analog tilt control signal (T-CON)a.

From a viewpoint of processing speed, it is desirable that the skew estimating section 12 and the tilt control section 13 be included in a generalized circuit such as a DSP so as to be controlled in accordance with a program. Alternatively, the skew estimating section 12 and the tilt control section 13 may be included in a circuit that is controlled without a program.

The functions of the skew estimating section 12 and the tilt control section 13 can also be realized in a processing performed by a circuit, such as the drive system control section 15 or any other circuit, that is controlled in accordance with a program. In a case where a table (storage area) is desired to be provided as described separately below, a memory provided in the program-controlled circuit or outside the circuit may be used.

Figure 10:
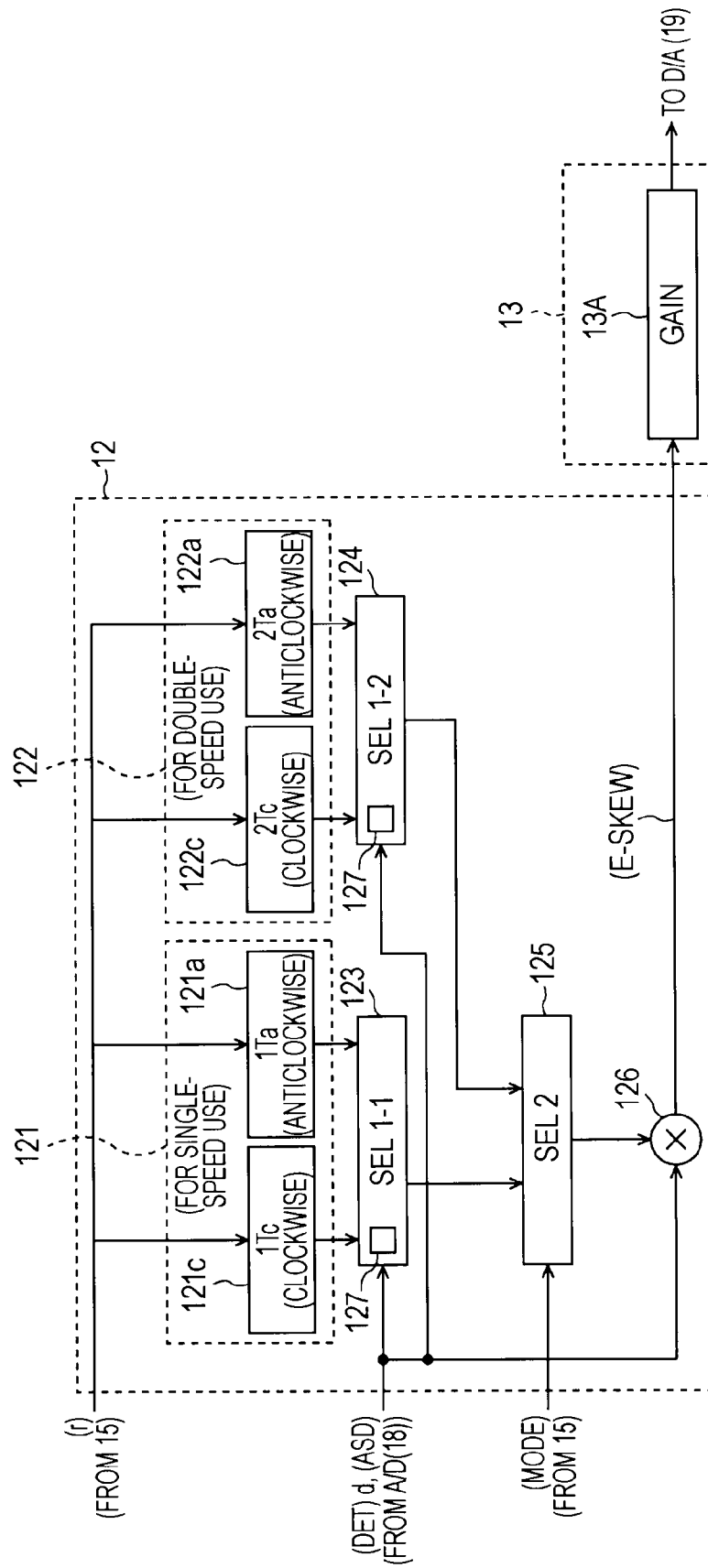
FIG. 10 relates to the another embodiment of the present invention and shows a detailed exemplary configuration of a circuit block including a skew estimating section and a tilt control section shown in FIG. 9.

FIG. 10 shows a detailed exemplary configuration of a circuit block including the skew estimating section 12 and the tilt control section 13. The circuit block shown in FIG. 10 is configured on the basis of the concept described in "Method for Estimating Skew" and is designed considering the three factors described in "Factors Causing Variations in Skew".

In the configuration shown in FIG. 10, the skew estimating section 12 includes a first memory area 121 having a clockwise single-speed table (1Tc) 121c and an anticlockwise single-speed table (1Ta) 121a, and a second memory area 122 having a clockwise double-speed table (2Tc) 122c and an anticlockwise double-speed table (2Ta) 122a. Here, "clockwise" and "anticlockwise" denote the directions of the angular velocities about the X axis shown in FIGS. 3B and 3A, respectively, and "single-speed" and "double-speed" denote the speeds of linear velocities at a position on the optical disc 2 where data is picked up by the optical pickup 4. "Single-speed" indicates the linear velocity of normal speed, and "double-speed" indicates the linear velocity of twice the normal speed.

The first memory area 121 and the second memory area 122 each include all circuits for reading data from the tables.

The disc radial position (r) can be input from the drive system control section 15 to each of the two single-speed tables 121c and 121a and the two double-speed tables 122c and 122a.

These tables store radial skew coefficients (k), in correspondence with disc radial positions (r), that differ between the single-speed table and the double-speed table and between the clockwise table and the anticlockwise table, as shown in FIGS. 6A and 6B.

This will be described more specifically. For the same disc radial position (r), the radial skew coefficient (k) stored in the double-speed table is larger than that stored in the single-speed table, as shown in FIGS. 6A and 6B. Further, for the same disc radial position (r), the radial skew coefficient (k) stored in the anticlockwise single-speed (or double-speed) table is larger than that stored in the clockwise single-speed (or double-speed) table. It should be noted that the relationship between the radial skew coefficient (k) in the clockwise table and the radial skew coefficient (k) in the anticlockwise table may be reversed depending on the configuration of a mechanism that rotatably supports the optical disc 2.

The skew estimating section 12 further includes three selectors 123 to 125 and a multiplier 126.

The selector 123 is a circuit (or a program processing step and means for performing the same) that receives outputs from the clockwise single-speed table 121c and the anticlockwise single-speed table 121a, selects either of the outputs in accordance with the digital detection signal (DET)d received from the A/D converter 18, and outputs the selected output.

The selector 124 is a circuit (or a program processing step and means for performing the same) that receives outputs from the clockwise double-speed table 122c and the anticlockwise double-speed table 122a, selects either of the outputs in accordance with the digital detection signal (DET)d received from the A/D converter 18, and outputs the selected output.

The selectors 123 and 124 each have an input section. The input section is provided with a polarity checker 127 that detects the polarity of the digital detection signal (DET)d and checks the direction of the angular velocity about the X axis. The selectors 123 and 124 each select an output, as described above, in accordance with the result of the check performed by the polarity checker 127.

The selector 125 is a circuit (or a program processing step and means for performing the same) that receives outputs from the selectors 123 and 124, selects either of the outputs in accordance with the mode signal (MODE) received from the drive system control section 15, and outputs the selected output.

The multiplier 126 receives the digital detection signal (DET)d and one radial skew coefficient (k) output from the selector 125, and multiplies the angular velocity having the positive or negative polarity, indicated by the detection signal (DET)d, by the radial skew coefficient (k). The multiplier 126 provides an estimated skew value (E-SKEW). The estimated skew value (E-SKEW) is output to the tilt control section 13.

The tilt control section 13 includes a sensitivity gain multiplying circuit 13A. The sensitivity gain multiplying circuit 13A is a circuit (or a program processing step and means for performing the same) that converts the estimated skew value (E-SKEW) that is input thereto into a digital tilt-controlled variable (T-CON)d, which is a control parameter for tilt drive.

The digital tilt-controlled variable (T-CON)d obtained by the sensitivity gain multiplying circuit 13A can be supplied to the D/A converter 19 shown in FIG. 9.

Next, a process of skew estimation and tilt control performed in the above-described configuration will be described.

Referring to FIG. 9, an output (analog detection signal (DET)a) indicating the angular velocity about the X axis is obtained from the angular velocity sensor 7 disposed in the XY plane. The analog detection signal (DET)a is sent from the angular velocity sensor 7 to the servo DSP 20.

In the servo DSP 20, the A/D converter 18 digitalizes the analog detection signal (DET)a supplied from the angular velocity sensor 7 and supplies the digitalized signal as angular velocity data (ASD) to the skew estimating section 12.

On the other hand, the drive system control section 15 supplies the skew estimating section 12 with disc radial positions (r) that sequentially vary with the movement of the optical pickup 4 scanningly following tracks on the optical disc 2. The drive system control section 15 also supplies the skew estimating section 12 with a mode signal (MODE) indicating the speed mode: the single-speed mode or the double-speed mode.

More specifically, a disc radial position (r) to be subjected to skew estimation is supplied in parallel from the drive system control section 15 to the four tables shown in FIG. 10, i.e., the single-speed tables 121c and 121a and the double-speed tables 122c and 122a. Meanwhile, the mode signal (MODE) is supplied from the drive system control section 15 to the selector 125. In addition, the angular velocity data (ASD) is supplied in parallel from the A/D converter 18 to the selectors 123 and 124 and the multiplier 126.

The first memory area 121 performs conversion, referring to the disc radial position (r) that has been supplied thereto, in which a radial skew coefficient (k) corresponding to the disc radial position (r) is read from each of the single-speed tables 121c and 121a. The two radial skew coefficients (k) are supplied to the selector 123.

Likewise, the second memory area 122 performs conversion, referring to the disc radial position (r) that has been supplied thereto, in which a radial skew coefficient (k) corresponding to the disc radial position (r) is read from each of the double-speed tables 122c and 122a. The two radial skew coefficients (k) are supplied to the selector 124.

In the selector 123, the polarity checker 127 checks the polarity of the angular velocity data (ASD) that has been input thereto. For example, when the polarity is found to be positive, the radial skew coefficient (k) supplied from the clockwise single-speed table 121c is selected. When the polarity is found to be negative, the radial skew coefficient (k) supplied from the anticlockwise single-speed table 121a is selected. The selected radial skew coefficient (k) is output to the selector 125.

Likewise, in the selector 124, the polarity checker 127 checks the polarity of the angular velocity data (ASD) that has been input thereto. For example, when the polarity is found to be positive, the radial skew coefficient (k) supplied from the clockwise double-speed table 122c is selected. When the polarity is found to be negative, the radial skew coefficient (k) supplied from the anticlockwise double-speed table 122a is selected. The selected radial skew coefficient (k) is output to the selector 125.

The selector 125 selects one of the outputs from the selectors 123 and 124 in accordance with the mode signal (MODE) that has been input thereto. More specifically, when the mode signal (MODE) indicates the single-speed mode, the selector 125 selects the radial skew coefficient (k) that has been output via the selector 123 from one of the single-speed tables. When the mode signal (MODE) indicates the double-speed mode, the selector 125 selects the radial skew coefficient (k) that has been output via the selector 124 from one of the double-speed tables. The selected radial skew coefficient (k) is supplied to the multiplier 126.

The multiplier 126 multiplies the positive or negative angular velocity data (ASD) that has been input thereto and the radial skew coefficient (k) that has been output from the selector 125 together, thereby generating an estimated skew value (E-SKEW). The estimated skew value (E-SKEW) is supplied to the sensitivity gain multiplying circuit 13A of the tilt control section 13.

The sensitivity gain multiplying circuit 13A calculates control parameters (gain and control direction) for tilt drive so that the estimated skew value (E-SKEW) can be cancelled out, in accordance with the polarity and the value of the estimated skew (E-SKEW) that has been input thereto. Subsequently, the sensitivity gain multiplying circuit 13A outputs an analog tilt-controlled variable (T-CON)a containing information on the calculated gain and control direction. The analog tilt-controlled variable (T-CON)a is converted by the D/A converter 19 into a digital tilt-controlled variable (T-CON)d. The digital tilt-controlled variable (T-CON)d is supplied to the tilt drive section 14.

The tilt drive section 14 generates a tilt drive signal (T-DRV) that actually drives the tilt actuator, in accordance with the control direction and the gain contained in the digital tilt-controlled variable (T-CON)d that has been input thereto.

The tilt drive signal (T-DRV) contains information on, for example, a voltage value indicating the tilt angle ($\alpha$) of the objective lens 41 and the polarity indicating the tilt direction that can cancel out the estimated skew value provided by the skew estimating section 12. Thus, when the tilt actuator is controlled in accordance with the tilt drive signal (T-DRV), an accurately estimated skew value is provided by the skew estimating section 12 considering all of the three factors described above, whereby the recording surface 2A of the optical disc 2 and the optical axis of the light beam (LB) can be corrected to become substantially perpendicular to each other.

Consequently, the skew margin increases and the frequency of interruptions of recording or reproduction due to skew is reduced.

Variations

The above-described embodiments concern the case where radial skew coefficients (k) are stored in tables. However, the present invention is not limited to such a case. For example, in a case where the characteristic curves Q1 and Q2 shown in FIG. 7 can be expressed by approximation in the form of mathematical expressions, respectively, as functions of the disc radial position (r), such mathematical expressions for the respective speed modes may be stored. In that case, the radial skew coefficient (k) can be calculated by setting the disc radial position (r) in each of the expressions.

The above-described embodiments concern the case where a desired radial skew coefficient (k) is read directly from the corresponding table. However, the present invention is not limited to such a case. For example, if a desired disc radial position (r) is not listed in the table, the corresponding radial skew coefficient (k) may be calculated by linear interpolation or the like using the radial skew coefficient (k) corresponding to another disc radial position (r) close to the desired one.

The above-described embodiments concern the case where relationships between angular velocity data (ASD) and radial skew in the optical disc 2 are stored as radial skew coefficients (k) in tables. However, the present invention is not limited to such a case. For example, relationships between angular velocity data (ASD) and digital tilt-controlled variables (T-CON)d may be stored as certain coefficients in tables for radial skew coefficients. In that case, the sensitivity gain multiplying circuit 13A is omitted and the function thereof is stored in the form of a table in the skew estimating section 12.

The above-described embodiments concern the case where the optical disc drive apparatus 1A has two different speed modes, a single-speed mode and a double-speed mode, and radial skew coefficients (k) for each of the two modes are stored in two different tables, a "clockwise" table and an "anticlockwise" table, i.e., four different tables in total. However, the present invention is not limited to such a case. Three or more speed modes may be provided. When the number of speed modes is denoted as N, the number of tables to be provided is 2N. In that case, the selector 125, handling two inputs and one output in the above-described embodiments, can be changed to another selector handling N inputs and one output (where N=3 or larger).

The present invention is not limited to the case where the rotating speed of the optical disc 2 is changed while the linear velocity is maintained at a constant level by the CLV method. Alternatively, the rotating speed of the optical disc 2 may be maintained at a constant level by a constant angular velocity (CAV) method, for example.

The optical disc 2 is not limited to a Blu-ray Disc (BD), and may be any of other optical discs such as a digital versatile disc (DVD) and a compact disc (CD). Moreover, the diameter of the optical disc 2 is not limited to 120 mm, and may be 80 mm, for example.

If such discs employ different standards, it is expected that the amount of radial skew caused by the gyro effect varies because optical discs of different types may have different configurations, different materials, and different diameters. Therefore, a plurality of radial skew coefficient tables may be prepared in advance for various types and diameters of optical discs. In such a case, a desired radial skew coefficient (k) may be read as follows. The type and diameter of a target optical disc is detected, and then the radial skew coefficient table to be used is changed appropriately.

Configurations and mechanisms shown in the drawings, in particular, a mechanism that holds and rotates the optical disc 2, are not limited to those shown in the corresponding drawings, and may be of any other type.

According to the embodiments, the following advantages can be obtained.

In general, extremely large disc skew leads to large jitter, and a skew value exceeding the skew margin leads to frequent interruptions of recording and reproduction. Even without interruptions of recording and reproduction, large jitter prevents recording and reproduction quality from being ensured. Therefore, skew estimation with high accuracy is desired.

In the above-described embodiments, the direction of disc skew is detected referring to the output from the angular velocity sensor. Therefore, disc skew can be estimated considering not only the number of disc revolutions and the radial disc address but also dependence on skew direction. Further, in accordance with the result of this estimation, tilt correction of the optical axis of the light beam can be performed.

To summarize, application of the present invention realizes efficient real-time high-speed recording and reproduction while preventing interruptions of recording and reproduction, whereby an optical disc drive apparatus whose recording signal and reproduction signal are of very high quality, a camera apparatus including such an optical disc drive apparatus, and a method for controlling the tilt of a light beam with high accuracy can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc drive apparatus comprising:
   a rotatably supporting drive unit configured to apply a rotatably driving force to an optical disc rotatably supported thereby;
   an optical pickup configured to apply a light beam to the optical disc that is rotating;
   an angular velocity sensor configured to detect the magnitude and direction of an angular velocity acting about an axis lying in a radial direction of the optical disc in which the optical pickup is movably disposed, the angular velocity occurring because of an external force and being applied to the optical disc that is rotating;
   a skew estimating section configured to estimate skew in the optical disc in accordance with a result of detection by the angular velocity sensor, such that one estimated skew value in a case where the angular velocity is applied in one direction in which the optical disc moves away from the optical pickup is made to differ from another estimated skew value in a case where the angular velocity is applied in the same magnitude as that of the one estimated skew value but in another direction, opposite to the one direction, in which the optical disc approaches the optical pickup; and
   a tilt drive section configured to change the tilt of the light beam in accordance with the estimated skew value and to correct a shift in a position on the optical disc where the light beam is applied, the shift occurring because of the angular velocity.

2. The optical disc drive apparatus according to claim 1, wherein the skew estimating section receives positional information in the radial direction corresponding to the position on the optical disc where the light beam is applied, and generates an estimated skew value corresponding to the amount of warpage in the optical disc in accordance with the positional information that is received.

3. The optical disc drive apparatus according to claim 1, wherein the skew estimating section generates an estimated skew value corresponding to the amount of warpage in the optical disc in accordance with a linear velocity at the position on the optical disc where the light beam is applied.

4. The optical disc drive apparatus according to claim 2, further comprising:
   a tilt control section configured to convert the estimated skew value into a controlled variable and to output the controlled variable to the tilt drive section,
   wherein the skew estimating section includes
      a first storage region storing a plurality of first correction coefficients varying with addresses on the optical disc in the radial direction;
      a second storage region storing a plurality of second correction coefficients varying with the addresses and being larger than the first correction coefficients for the respective addresses;
      a selector configured to select one of the first storage region and the second storage region in accordance with the direction of the angular velocity; and
      a multiplier configured to multiply the angular velocity by one of the first correction coefficients or one of the second correction coefficients and to output the angular velocity after multiplication as the estimated skew value to the tilt control section, the one of the first correction coefficients or one of the second correction coefficients being output in response to inputs of the address recognized from a signal read by the optical pickup and the angular velocity into one of the first storage region and the second storage region selected by the selector.

5. The optical disc drive apparatus according to claim 4,
wherein each of the first storage region and the second storage region is provided for a number of speed modes including a single-speed mode, the speed mode corresponding to the linear velocity at the address on the optical disc recognized by the optical pickup,
wherein the selector is provided for the number of speed modes, and
wherein the optical disc drive apparatus includes a control section configured to recognize the address from the signal read by the optical pickup, to output the address that is recognized to the first storage region and the second storage region, to recognize the speed mode, and to allow an output from one of the selectors to be input to the multiplier in accordance with the speed mode that is recognized.

6. The optical disc drive apparatus according to claim 1,
wherein, in a case where a force holding the optical disc, which is rotating, applied from a side of the optical disc far from the optical pickup includes a repulsion against warpage in the optical disc smaller than a repulsion against the warpage included in a force holding the optical disc applied from a side of the optical disc near to the optical pickup, the skew estimating section estimates the skew such that a first skew occurring when the angular velocity is applied in one direction in which the optical disc moves away from the optical pickup is larger than a second skew occurring when the angular velocity of the same magnitude as that for the first skew is applied in another direction, opposite to the one direction, in which the optical disc approaches the optical pickup, and
wherein, in a case where the relationship between the magnitudes of the two repulsions is reversed, the skew estimating section estimates the skew such that the first skew is smaller than the second skew.

7. A camera apparatus comprising:
a shooting section;
a rotatably supporting drive unit configured to apply a rotatably driving force to an optical disc rotatably supported thereby;
an optical head including an optical pickup configured to apply a light beam to the optical disc that is rotating and a tilt drive section capable of changing the tilt of the light beam;
an angular velocity sensor configured to detect the magnitude and direction of an angular velocity acting about an axis lying in a radial direction of the optical disc in which the optical pickup is movably disposed, the angular velocity occurring because of an external force and being applied to the optical disc that is rotating; and
a skew estimating section configured to estimate skew in the optical disc in accordance with a result of detection by the angular velocity sensor, such that one estimated skew value in a case where the angular velocity is applied in one direction in which the optical disc moves away from the optical pickup is made to differ from another estimated skew value in a case where the angular velocity is applied in the same magnitude as that of the one estimated skew value but in another direction, opposite to the one direction, in which the optical disc approaches the optical pickup,
wherein the tilt drive section corrects, in accordance with the estimated skew value, a shift in a position on the optical disc where the light beam is applied, the shift occurring because of the angular velocity.

8. A method for controlling the tilt of a light beam in accordance with skew in an optical disc, the method comprising the steps of:
applying a rotatably driving force to the optical disc that is supported in a rotatable state while applying the light beam from an optical pickup to the optical disc that is rotating;
detecting the magnitude and direction of an angular velocity acting about an axis lying in a radial direction of the optical disc in which the optical pickup is movably disposed, the angular velocity occurring because of an external force and being applied to the optical disc that is rotating;
estimating a skew value in the optical disc in accordance with a result of detecting the angular velocity; and
changing the tilt of the light beam in accordance with the skew value that is estimated and correcting a shift in a position on the optical disc where the light beam is applied, the shift occurring because of the angular velocity,
wherein the skew value is estimated such that one skew value in a case where the angular velocity is applied in one direction in which the optical disc moves away from the optical pickup is made to differ from another skew value in a case where the angular velocity is applied in the same magnitude as that of the one skew value but in another direction, opposite to the one direction, in which the optical disc approaches the optical pickup.

* * * * *